United States Patent [19]

Rosa

[11] 4,344,914
[45] Aug. 17, 1982

[54] RETRIEVABLE FUEL PIN END MEMBER FOR A NUCLEAR REACTOR

[75] Inventor: Jerry M. Rosa, Los Gatos, Calif.

[73] Assignee: The United States of America as represented by the United States Department of Energy, Washington, D.C.

[21] Appl. No.: 175,814

[22] Filed: Aug. 6, 1980

[51] Int. Cl.³ .............................................. G21C 3/32
[52] U.S. Cl. .................................. 376/437; 376/446; 376/451
[58] Field of Search ....................... 376/437, 446, 451

[56] References Cited

U.S. PATENT DOCUMENTS

| | | | |
|---|---|---|---|
| 3,109,802 | 11/1963 | Blake | 376/437 |
| 3,862,884 | 1/1975 | Jabsen | 376/437 |
| 3,890,197 | 6/1975 | Butts | 376/437 |
| 3,945,885 | 3/1976 | Cocker | 376/437 |
| 3,951,739 | 4/1976 | Frick | 376/437 |
| 3,996,101 | 12/1976 | Marmonier | 376/437 |
| 4,003,787 | 1/1977 | Marmonier | 376/437 |

Primary Examiner—Donald P. Walsh
Attorney, Agent, or Firm—L. E. Carnahan; Roger S. Gaither; Richard G. Besha

[57] ABSTRACT

A bottom end member (17b) on a retrievable fuel pin (13b) secures the pin (13b) within a nuclear reactor (12) by engaging on a transverse attachment rail (18) with a spring clip type of action. Removal and reinstallation if facilitated as only axial movement of the fuel pin (13b) is required for either operation. A pair of resilient axially extending blades (31) are spaced apart to define a slot (24) having a seat region (34) which receives the rail (18) and having a land region (37), closer to the tips (39) of the blades (31) which is normally of less width than the rail (18). Thus an axially directed force sufficient to wedge the resilient blades (31) apart is required to emplace or release the fuel pin (13b) such force being greater than the axial forces on the fuel pins (13b) which occur during operation of the reactor (12).

12 Claims, 4 Drawing Figures

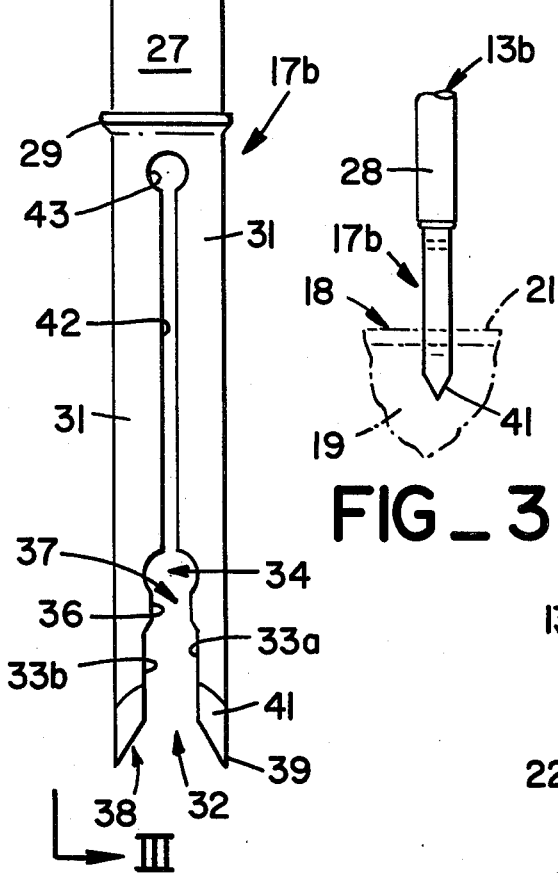
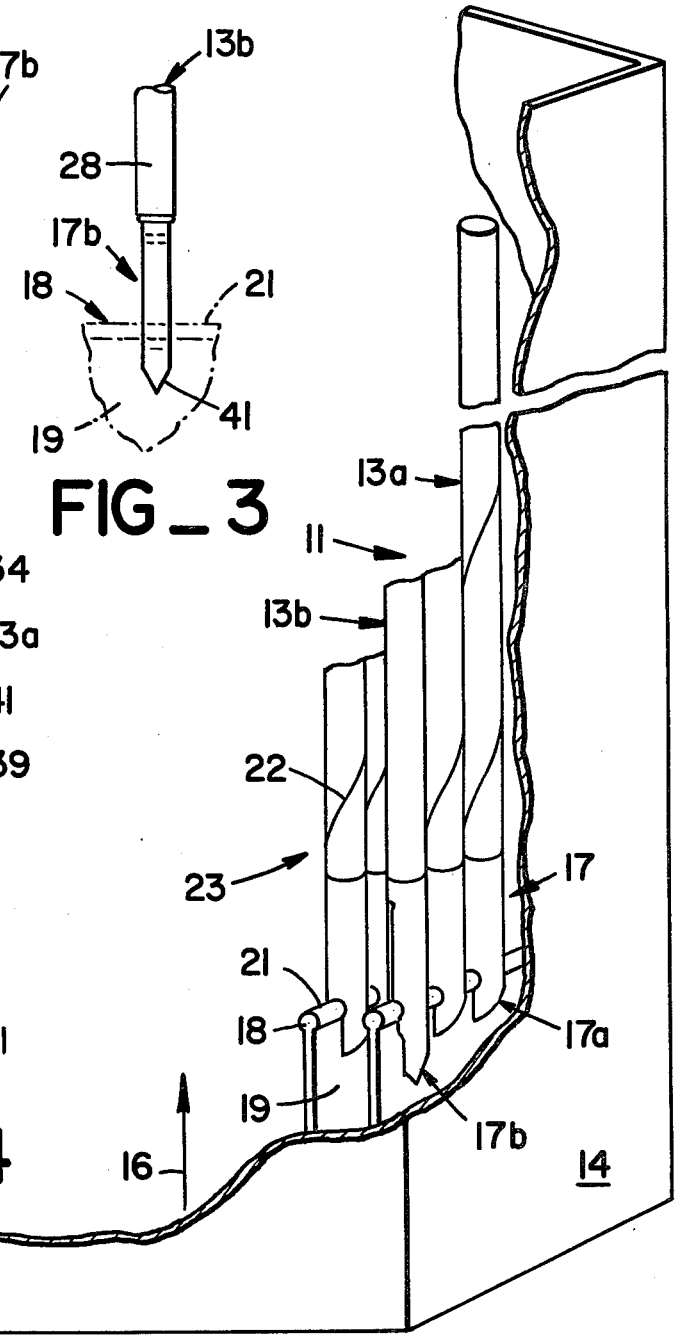
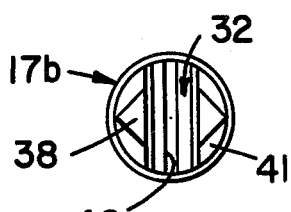

RETRIEVABLE FUEL PIN END MEMBER FOR A NUCLEAR REACTOR

The United States govenment has rights in this invention pursuant to contract number EV-78-6-01-6628 between the U.S. Department of Energy and the General Electric Company.

BACKGROUND OF THE INVENTION

This invention relates to nuclear reactors and more particularly to apparatus for fastening fuel pins to the attachment rails which support the fuel elements of a reactor.

The upright parallel fuel pins which contain the fissionable material at the core of a reactor are commonly supported through bottom end members which are engaged on transverse attachment rails. More particularly, the attachment rails are typically of circular cross section and extend along the upper edges of upstanding support plates of less thickness. The fuel pin lower end member has an upwardly extending slot with a width similar to the thickness of the upstanding plate and which terminates at a transverse passage of circular cross section through which the rail extends. The lower ends of such fuel pins are thus locked to the rails and the pins cannot be removed by vertical forces. An annular housing encircles the fuel pin bundle to prevent lateral displacement of the pins.

It is not possible to disengage a particular individual fuel pin of the kind described above from the rail and then remove it from the core except through an exceedingly complex, time consuming and costly sequence of operations. Removal of such a fuel pin requires that it be moved sidewardly off the end of the associated rail. If it is one of the interior pins, this cannot be done without first removing others of the pins that are attached to the same rail.

Space constrictions and the typically high level of radioactivity do not permit such operations to be performed at the core region of most reactors. As a practical matter, retrieval of a particular individual fuel pin of the above described type from a reactor requires removal of the fuel pin assembly as a whole after which the above described operations must still be performed using, at least in most cases, complex remotely controlled tools.

The problems discussed above in connection with removal of a fuel pin from the reactor core are, for essentially similar reasons, also encountered where an individual fuel pin is to be installed into the reactor core.

It is highly advantageous, at least in some reactor operations, if one or more specific fuel pins can be more simply and conveniently retrieved after a period of reactor operation and if the same pin or a replacement can be reinstalled without an extensive disassembly of the reactor structure. Among other advantages, this capability greatly facilitates analysis of the chemical and physical changes which occur in fuel pins in the course of reactor operation. A retrievable fuel pin cannot be locked to the attachment rail in the manner described above. To enable retrievability, a typical prior practice has been to provide a slotted lower end member which fits onto the rail but which offers no significant resistance to upward withdrawal of the fuel pin. A stop plate is situated above the fuel pin assembly. To hold the retrievable pin down, it has been made more lengthy than the other fuel pins so that the top of the retrievable pin protrudes above the level of the tops of the other pins to almost contact the stop plate. Among other disadvantages, this arrangement does not provide a desirable amount of tolerance for axial growth of the retrievable fuel pin. It would be preferable to provide for fastening of a retrievable fuel pin at the lower end rather than at the top.

SUMMARY OF THE INVENTION

Accordingly it is an object of this invention to provide for the fastening or retrievable fuel pins to attachment rails within nuclear reactors.

It is another object of this invention to provide an end member construction for fastening fuel pins to attachment rails within a nuclear reactor which enables the withdrawal of the fuel pins, by exertion of axial forces thereon of a predetermined magnitude.

It is still another object of the invention to provide for the fastening of an end of a fuel pin to an attachment rail by pushing on the pin and for the retrieval of the pin by pulling thereon including providing for self piloting of the pin onto the rail in the event of an initial misalignment or misorientation of the pin relative to the rail.

It is still a further object of the invention to provide for the holding down of retrievable fuel pins without restricting axial growth of the fuel pins from thermal expansion, void swelling or other causes.

It is another object of the invention to provide a retrievable fuel pin which need not necessarily extend above the level of other fuel pins in a reactor.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, a retrievable nuclear reactor fuel pin has an end member for fastening the fuel pin to a transversely extending rail, the end member having a pair of blades defining a slot for receiving the rail. The end member is formed at least in part of resilient material and the slot has a configuration which requires wedging apart of the blades by the rail when the fuel pin is pulled away from the rail.

In a further aspect of the present invention, in accordance with its objects and purposes, wherein the rail has a rounded surface of predetermined diameter which is received in the slot of the fuel pin end member, the facing surfaces of the blades which define the slot have a configuration and spacing which causes one region of the slot to have a width smaller than the predetermined diameter and which causes a subsequent region of the slot to have a wider curved profile substantially conforming to the rounded surface of the rail.

In another aspect of the invention, the ends of the blades are pointed and the facing surfaces of the blades which define the outer end region of the slot are angled relative to each other to cause the outer end region of the slot to be of progressively greater width towards the ends of the blades.

In still another aspect of the invention, the blades extend from an end plug portion secured to the fuel pin and forming an end closure thereof, the end member including the blades and end plug portion being a single integral element formed of the resilient material.

In a further aspect of the invention the resilient material establishes spring forces which prevent withdrawal of the fuel pin from the rail except by an axial force having a magnitude exceeding the maximum axial forces which may be exerted on the fuel pin during operation of the reactor.

The present invention fastens a fuel pin to an attachment rail within a reactor while enabling installation and retrieval of the pin by axially directed pushing or pulling forces of at least a predetermined magnitude. More complex operations, such as removal of other pins, sideward sliding movement along the attachment rail, or the like, are not required in order to unfasten and retrieve a particular pin. The invention does not require any specialized hold down structure at the top of the fuel pin and does not obstruct axial growth of the fuel pin from thermal expansion, void swelling or other causes. During installation of the pin, angular misorientations with the rail and small lateral misalignments are self corrected. In one preferred form, the end member which engages the rail may be an economically manufactured single integral element secured to the end of the fuel pin and which also serves as an end closure therefor.

BRIEF DESCRIPTION OF THE DRAWINGS

The accompanying drawings, which are incorporated in and form a part of the specification, illustrate a preferred embodiment of the invention and, together with the description, serve to explain the principles of the invention. In the drawings:

FIG. 1 is a broken out, foreshortened, perspective view of a portion of the core region of a nuclear reactor in which fuel pins are coupled to attachment rails by an embodiment of the present invention, FIG. 2 is a side view of a fuel pin end member of the form employed in the reactor of FIG. 1, FIG. 3 is a view of the fuel pin end member of FIG. 2 taken along line III—III thereof, and FIG. 4 is an end view of the fuel pin end member of FIG. 2.

DETAILED DESCRIPTION OF THE INVENTION

Reference will now be made in detail to the present preferred embodiment of the invention, an example of which is illustrated in the accompanying drawings.

Referring initially to FIG. 1, the core region 11 of a nuclear reactor 12 includes a plurality of fuel pins 13 of rod-like configuration which contain the fissionable material. Fuel pins 13 extend vertically in parallel side by side relationship with each other within a housing or wrapper 14 which is typically of hexagonal cross section. A flow 16 of fluid such as liquid sodium for example is directed upwardly through the bundle of fuel pins 13 to extract the thermal energy generated by the fission reaction.

Fuel pins 13 are supported at the bottom ends through fuel pin end members 17 which engage on parallel attachment rails 18 that extend transversely within housing 14 below the fuel pin assembly 23, a row of the fuel pins being supported on each individual rail. Rails 18, in this example, are of circular cross section and are formed along the upper edges of a series of spaced apart, parallel, upstanding support plates 19 which are secured to housing 14, the plates having a thickness smaller than the diameter of the rounded surfaces 21 of the rails.

To maintain a small spacing between adjacent fuel pins 13 and between the outermost pins and the wall of housing 14, a wire 22 is wrapped spirally around each pin with the exception of one or more specialized fuel pins to be hereinafter described.

Aside from certain of the fuel pin end members 17, the reactor 12 may otherwise be of known construction and thus need not be further described.

The fuel pin end members 17a and 17b in this example are of two different types. End members 17a of the first type are conventional and do not enable disengagement of the associated fuel pins 13a from rails 18 except by the cumbersome process of removing the entire fuel pin assembly 23 from housing 14 to enable sidward sliding of the fuel pin 13a off the end of the rail 18. The fuel pins 13a cannot be withdrawn from the fuel pin assembly 23 by a direct upward force as the rails 18 cannot pass through the relatively narrow slots at the lower portions of the end members 17a.

Predetermined ones 13b of the fuel pins 13 have lower end members 17b embodying the present invention and constitute what is herein termed a retrievable fuel pin. The retrievable fuel pins 13b may be withdrawn directly upwardly from the associated rail 18 by an axially directed force of predetermined magnitude and the same pin or a replacement may be installed by being pushed axially downward into the assembly 23 with a sufficient force.

The end member 17b construction which provides for a retrievable fuel pin 13b may be understood by reference to FIGS. 2, 3 and 4 in conjunction. The end member 17b in a preferred embodiment is constructed as a single integral element which, in addition to fastening the fuel pin 13b to an attachment rail 18, also functions as a bottom end closure of the fuel pin. End member 17b is formed of a resilient material, for reasons to be hereinafter discussed, that is nonreactive with the fluid of flow 16 and which is stable in the high temperature environment of the core region 11. In most instances spring steel is a suitable material for the end member 17b.

End member 17b has an end plug portion 27 of circular cross section which fits into the lower end of the cylindrical cladding 28 in coaxial relationship therewith and which is weld sealed to the cladding. A circular flange 29 at the lower end of the plug portion facilitates such securing of the end member 17b to the other components of the fuel pin 13b. The lower portion of the end member 17b is divided into a pair of spaced apart blades 31 by a slot 32 which extends upward from the lower end of the end member to a point slightly below flange 29.

At an intermediate position along slot 32, the facing surfaces 33 of the blades 31 which define the slot 32 have a circular profile conforming with the rounded surface 21 of rail 18 and which is of similar diameter to define a rail seat region 34 of the slot. Immediately below the seat region 34, the facing surfaces 33 are closer together to define lands 36 spaced apart a distance similar to the thickness of the support plate 19 of the rail 18 to define a land region 37 of the slot. Below the land region 37, the slot 32 has a slightly greater width. At the lowermost or outer region 38 of the slot 32, the facing blade surfaces 33a and 33b are divergent causing the outer end region of the slot to be of progressively greater width towards the lower ends 39 of the blades 31. The lower ends or tips 39 of the blades 31 also have convergent side surfaces 41 causing the tips of the blades to be pointed.

To impart sufficient elasticity to the blades 31 a relatively narrower inner portion 42 of slot 32 extends upwardly from seat region 34 and terminates at a bore 43 located below flange 29.

The foregoing description of the widths of various regions of the slot 24 in relation to the diameter of rail 18 and the thickness of rail support plate 19 should be understood to refer to conditions when the end member 17b is not stressed or under spring tension. As will be described in connection with operation of the invention, the blades 31 are temporarily forced apart and temporarily enlarge the various regions of the slot as the end member 17b is in the process of being engaged on rail 18 or is being disengaged therefrom.

In operation, with reference to all figures in conjunction, the retrievable fuel pin 13b may be initially installed in the fuel pin assembly 23 in either of two ways. As the nonretrievable fuel pins 13a must be fitted onto the ends of the rails 18 and then be slid sidewardly into position before the assembly 23 as a whole is installed in housing 14, it may be convenient to install the retrievable fuel pins 13b initially in the same manner. Alternately and unlike the nonretrievable fuel pins 13a, the retrievable pins 13b may be engaged on rails 18 by a strictly downward axial movement. Provided that sufficient force is exerted, the rail 18 wedges lands 36 apart and is then received in the conforming seat region 34 of slot 32 at which point the resiliency of the material of the end member 17b snaps the blades 31 back towards each other.

The retrievable fuel pin 13b is thus clamped to rail 18 by a spring clip action since withdrawal of the end member 17b requires a sizable upward force sufficient to again wedge the lands 36 apart against the resistance created by the resiliency of the end member material. To assure that the fuel pin 13b remains fastened to rail 18 during reactor operation, the blades 31 are proportioned in relation to the spring constant of the end member material and to the thickness of lands 36 to prevent upward motion of the fuel pin 13b until the upward force on the fuel pin exceeds a predetermined magnitude which is greater than the combined upward forces which the fuel pin may experience in the course of reactor operation. Such upward forces which may be experienced during reactor operation may arise from several causes including the hydraulic pressure differential between the upper and lower ends of the fuel pin 13b that results from the upward flow 16 of fluid, floatation force on the fuel pin from the fluid environment, and possible momentum forces arising from vibration or motion of the reactor as a whole. It is preferable that a sizable safety margin be provided for in fixing the pull free force required to detach the end member 17b from the rail 18. In one specific embodiment of the invention in which the maximum lifting forces that may be experienced by the pin 13b during operation of the reactor, from the causes described above, is about 1.1 lb (0.15 N), the blades 31 are proportioned to require an upward force of 10 lbs (1.4 N) before the end member 17b disengages from rail 18, this particular value being given for purposes of example only as other pull free forces may be appropriate in other embodiments of the invention.

The fuel pin 13b may be retrieved, after a period of reactor operation, by gripping the upper end with grappling mechanism of known construction and pulling directly upward with sufficient force to spread the blades 31 sufficiently to allow rail 18 to pass between lands 36. The same pin 13b may be reinstalled or a replacement pin may be substituted by a downward axial movement of sufficient force.

The divergent configuration of the lower end of slot 32 together with the pointed configuration of the tips 39 of blades 31 automatically corrects for angular misorientation and/or for misalignment between end member 17b and rail 18 during the process of installation of guiding the end member into the correct position, relative to the rail, for engagement. A rare exception occurs if the pointed tips 39 contact the rail 18 while in exact alignment with the rail centerline in which case the fuel pin may be backed off and turned slightly after which the installation process may proceed.

It has been pointed out that the nonretrievable fuel pins 13a have a spiral wire 22 winding to assure the desired fuel pin spacing is maintained. If such a wire is present on the retrievable fuel pin 13b, it must be turned in the manner of a screw while being withdrawn and must be turned in an opposite direction while being installed to avoid interference with the wires 22 of adjacent fuel pins. To avoid this complication in instances where the retrievable fuel pin 13b is surrounded by nonretrievable fuel pins 13a, the wire 22 may simply be omitted from the retrievable fuel pin. The wires 22 of the surrounding fuel pins 13a establish the desired spacing by contact with the sides of the retrievable pin 13b.

Only a small number of the fuel pins 13b are of the retrievable form in this particular reactor 12 since the purpose of the retrievability in this example is to facilitate analysis of the physical and chemical changes that occur in fuel pins over a period of time. Analysis of only a representative sample of the fuel pins is necessary for this purpose. As is apparent, any or all of the other fuel pins may be of the retrievable form in instances where that is advantageous. For example in reactor systems in which it is possible to identify a malfunctioning fuel rod from among the others without removing the entire assembly 23, the capability of removing and replacing any of the fuel pins will simplify maintenance procedures.

The foregoing description of a preferred embodiment of the invention has been presented for purposes of illustration and description. It is not intended to be exhaustive or to limit the invention to the precise form disclosed, and obviously modifications and variations are possible in light of the above teaching. The embodiment was chosen and described in order to best explain the principles of the invention and its practical application to thereby enable others skilled in the art to best utilize the invention in various embodiments and with various modification as are suited to the particular use contemplated. It is intended that the scope of the invention is defined by the claims appended hereto.

I claim:

1. A retrievable and reinsertable nuclear reactor fuel pin having an end member for fastening said fuel pin to a transversely extending rail wherein said end member has a pair of blades having outer ends and facing surfaces defining a longitudinally extending slot therebetween for receiving said rail, said end member being formed at least in part of resilient material and having a configuration which requires wedging apart of said blades by said rail when said fuel pin is pulled away from said rail, the facing surfaces of said blades which define a first region of said slot are spaced apart a distance smaller than the spacing of the facing surfaces of said blades which define a second region of said slot, said first region of said slot being located closer to the outer ends of said blades than said second region of said slot, said facing surfaces of said blades defining a third region of said slot, said third region of said slot having a spacing of substantially constant distance between said facing surfaces and greater than the distance between said facing surfaces of said first region and being located closer to the outer ends of said blades than said first region.

2. A fuel pin as set forth in claim 1 wherein the facing surfaces of said blades additionally define an outer end region of said slot in which the facing surfaces are angled relative to each other to cause said outer end region of said slot to be of progressively greater width towards the ends of said blades.

3. A fuel pin as set forth in claim 2 wherein said ends of said blades are pointed.

4. A fuel pin as set forth in claim 1 wherein said end member has an end plug portion secured to said fuel pin and forming an end closure thereof and wherein said pair of blades extend from said end plug portion.

5. A fuel pin as set forth in claim 4 wherein said end member including said end plug portion and said pair of blades are a single integral element formed of said resilient material.

6. A fuel pin as set forth in claim 1 wherein said rail has a rounded surface of predetermined diameter which is received in said slot and wherein the facing surfaces of said blades which define said slot have a configuration and spacing which causes said first region of said slot to have a width smaller than said predetermined diameter and which causes said second region of said slot to have a wider curved profile substantially conforming to said rounded surface of said rail.

7. A fuel pin as set forth in claim 6 wherein said facing surfaces further define an inner region of said slot that is of less width than said predetermined diameter.

8. A fuel pin as set forth in claim 1 wherein said resilient material is formed to establish spring forces which prevent withdrawal of said fuel pin from said rail except by an axial force on said fuel pin which exceeds a pedetermined magnitude, said axial force of predetermined magnitude being greater than the maximum axial forces which may be exerted on said fuel pin during operation of said reactor.

9. A fuel pin as set forth in claim 1 wherein said second region of said slot defines a seat region in which said rail seats, and wherein said first region of said slot defines a land region of lesser width than said seat region, said blades being proportioned to cause release of spring tension from said resilient material when said rail seats in said seat region of said slot.

10. An end member for a nuclear reactor fuel pin which enables fastening of said fuel pin to a transverse attachment rail and withdrawal of said fuel pin from said rail by axial forces of greater than a predetermined magnitude, said end member having an end plug portion shaped to form an end closure for said fuel pin and further having a pair of spaced apart blade portions extending from said end plug portion and having facing surfaces forming a slot for receiving said rail, said facing surfaces in a land region thereof being spaced apart a distance less than the thickness of said rail, said facing surfaces in a subsequent rail receiving region which is closer to said end plug portion being spaced apart a greater distance than said land region, said facing surfaces in an outer end region which is further from said end plug portion than said land region being spaced apart over a non-tapering distance substantially equal to the spaced distance of the rail receiving region, at least said blades being formed of resilient material.

11. An end member for a nuclear reactor fuel pin as set forth in claim 10 wherein said end member including said end plug portion and said blades are formed as a single integral element of resilient metal.

12. An end member for a nuclear reactor fuel pin as set forth in claim 10 wherein said blade portions which are remote from said end plug portion include pointed tips and wherein said facing surfaces of said blade portions are divergent in the region of said tips.

* * * * *